United States Patent [19]

Schilplin

[11] Patent Number: 4,856,802
[45] Date of Patent: Aug. 15, 1989

[54] DROPOUT ASSEMBLY

[76] Inventor: Frederick C. Schilplin, Rte. 3, Annandale, Minn. 55302

[21] Appl. No.: 256,656

[22] Filed: Oct. 12, 1988

[51] Int. Cl.$^4$ .............................................. B62K 25/02
[52] U.S. Cl. ...................................... 280/288; 474/116
[58] Field of Search .................... 280/281.1, 288, 284, 280/274, 236, 238; 474/116, 78, 80, 81, 82

[56] References Cited

U.S. PATENT DOCUMENTS 570,327 10/1896 Naregang ............................ 474/116

FOREIGN PATENT DOCUMENTS 518975 6/1921 France ................................ 474/116
6504 of 1898 United Kingdom ................ 474/116
532353 1/1941 United Kingdom ................ 474/116

Primary Examiner—John A. Pekar
Attorney, Agent, or Firm—Douglas B. Farrow

[57] ABSTRACT

A dropout member for bicycle frames is designed to cause an easily replaceble part to separate under stresses which would normally be sufficient to cause bending or other damage to the bicycle frame itself. A relatively lightweight piece of material is bolted, riveted, adhesively bonded or otherwise fastened to the main portion of the dropout such that a torque or bending moment placed upon the derailleur plate serves to fracture or bend the derailleur plate or disengage the attaching mechanism.

10 Claims, 1 Drawing Sheet

DROPOUT ASSEMBLY

BACKGROUND OF THE INVENTION

Bicycle frames have been manufactured according to fairly standard designs for many years. With the relatively recent advent of mountain bikes which are used on more rugged terrain having various obstacles, several problems have increasingly become apparent. Should a branch or other object somehow become lodged between the spokes of the rear wheel, the branch can tend to impart a high degree of fore-aft or lateral stress on the derailleur assembly which is, in turn, passed through the dropout to the rear frame assembly which, in turn, can often be bent or otherwise damaged.

It is therefore an object of this assembly to provide a dropout assembly which prevents such frame bending and which allows easy and inexpensive repair of the bicycle after such an accident.

SUMMARY OF THE INVENTION

The dropout assembly of the instant invention is formed from a main plate which is attached by welding or other conventional construction to the seatstay tubes and the chainstay tubes of the bicycle frame. A dropout plate is thence attached by bolts, rivets, adhesive bonding or other fastening mechanism to the main plate and, the derailleur assembly, in turn, is fastened to the derailleur plate.

In the preferred embodiment, both the main plate and the derailleur plate have areas of relative thinness adjacent the point where they are attached to one another. This thinned area in particular on the derailleur plate allows bending forces to bend or fracture the derailleur plate easily so that it may allow the main plate on the main portion of the bicycle frame to escape any harm. Depending on the type of stress applied, the fastening mechanism is designed to fail prior to imparting damaging stress to the frame.

These and other objects and advantages of the invention will appear more fully from the following description made in conjunction with the accompanying drawings wherein like reference characters refer to the same or similar parts throughout the several views.

A BRIEF DESCRIPTION OF THE DRAWINGS

FIG. 1 is a side plan view of the instant invention.
FIG. 2 is a plan view looking at the dropout of the instant invention from the rear of the bicycle.

DESCRIPTION OF THE PREFERRED EMBODIMENT

Figure 1:
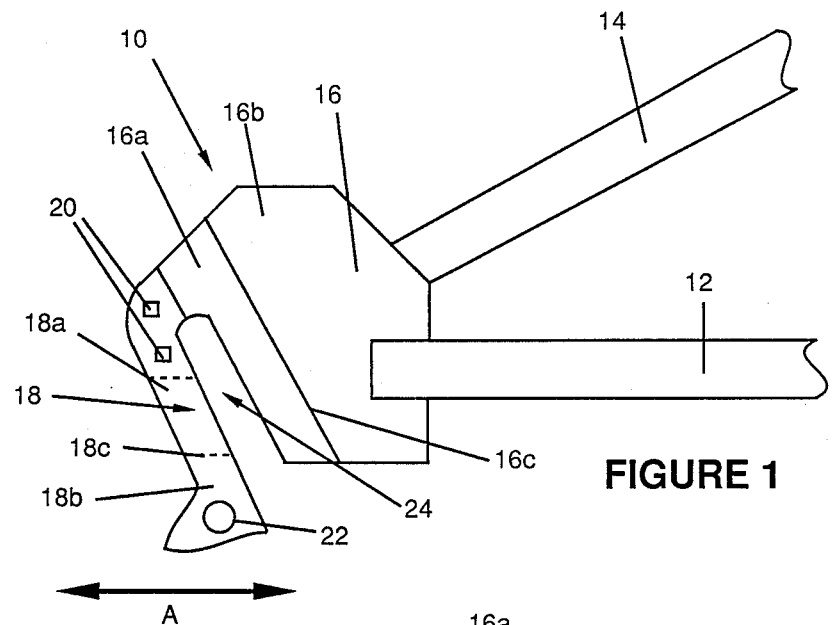

The dropout assembly 10 of the instant invention is designed for use with the bicycle having a chainstay tubes 12 and seatstay tubes 14. In particular, dropout assembly 10 is comprised of a main plate 16 to which is attached a derailleur plate 18 via an attachment means 20.

While attachment means 20 is shown in FIG. 1 as being bolts, it is well within the purview of this invention to utilize rivets, chemical or adhesive bonding or any other well known fastening mechanism having readily calculable fracture strengths. Main plate 16 is, in the preferred embodiment, formed of an aluminum having a thickness of 5/16 of an inch at main area 16b.

An attachment area 16a is an area of reduced thickness and represents the area to which derailleur plate 18 will be attached utilizing attachment means 20. Attachment area 16a in the preferred embodiment has a thickness of approximately 0.222 inches and is separated from main area 16b by a step 16c. Also in the preferred embodiment, derailleur plate 18 has an attachment area 18a of relatively reduced thickness.

In the preferred embodiment, derailleur plate 18 is formed of stainless steel and the attachment area 18a thereof has a thickness of 0.090 inches. The derailleur area 18b of derailleur plate 18 has an enhanced thickness of about 3/16 of an inch and is separated from the attachment area 18a by step 18c. Located in derailleur area 18b is a hole 22 for attachment of derailleur assembly 24. Rear axle assembly may be inserted into the slot 26 formed by main plate 16 and derailleur plate 18.

The dropout assembly of the instant invention is designed to fail just prior to frame damage under the two most common stress inducing situations. Arrow A in FIG. 1 shows a fore-aft force being exerted on attachment means 20 which are designed to yield just short of the stress which would bend or otherwise damage the frame.

Figure 2:
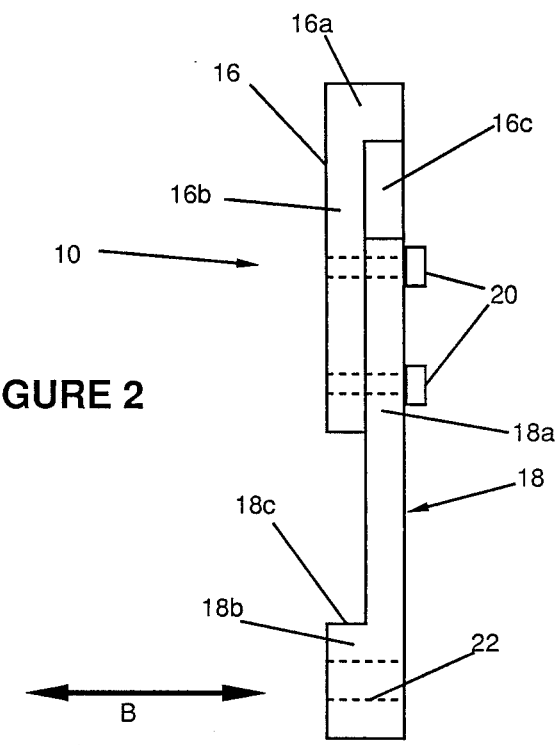

Arrow B in FIG. 2 shows a lateral force being exerted on the derailleur plate and assembly which will either cause yielding of attachment means 20 or bending or breaking of derailleur plate attachment area 18a.

Of course, in the event of such damage, the attachment means 20 need merely be drilled out or otherwise easily removed and the simple derailleur plate 18 replaced with a new one and fastened in place.

It is contemplated that various changes and modifications may be made to the dropout assembly without departing from the spirit and scope of the invention as defined by the following claims.

What is claimed is:

1. A dropout assembly for mounting a rear axle and a derailleur assembly on a bicycle frame, said dropout assembly comprising:
   a main plate attached to the chainstay tube and the seatstay tube of said frame, said main plate having means therein to mount said rear axle;
   a derailleur plate for attachment to said derailleur; and
   means attaching said derailleur plate to said main plate, said attachment means having strength sufficient to maintain attachment during normal use but designed to fail when subjected to stresses just short of those which would damage said main plate and said frame.

2. The dropout assembly of claim 1 wherein said attachment means comprises at least one bolt.

3. The dropout assembly of claim 1 wherein said attachment means comprises chemical bonding.

4. The dropout assembly of claim 1 wherein said attachment means comprises at least one rivet.

5. The dropout assembly of claim 1 wherein said main plate has an attachment area where said derailleur plate is attached, said attachment area being thinner than the remainder of said main plate.

6. The dropout of claim 5 wherein said derailleur plate comprises an attachment portion which is thinner than the rest of said derailleur plate.

7. The dropout assembly of claim 6 wherein said attachment area extends downwardly beyond said main plate towards said rest of said derailleur plate.

8. The dropout assembly of claim 7 wherein said rest of said derailleur plate comprises means for mounting said derailleur.

9. The dropout assembly of claim 1 wherein said main plate is aluminum.

10. The dropout assembly of claim 9 wherein said derailleur plate is stainless steel.

* * * * *